Figure 1:
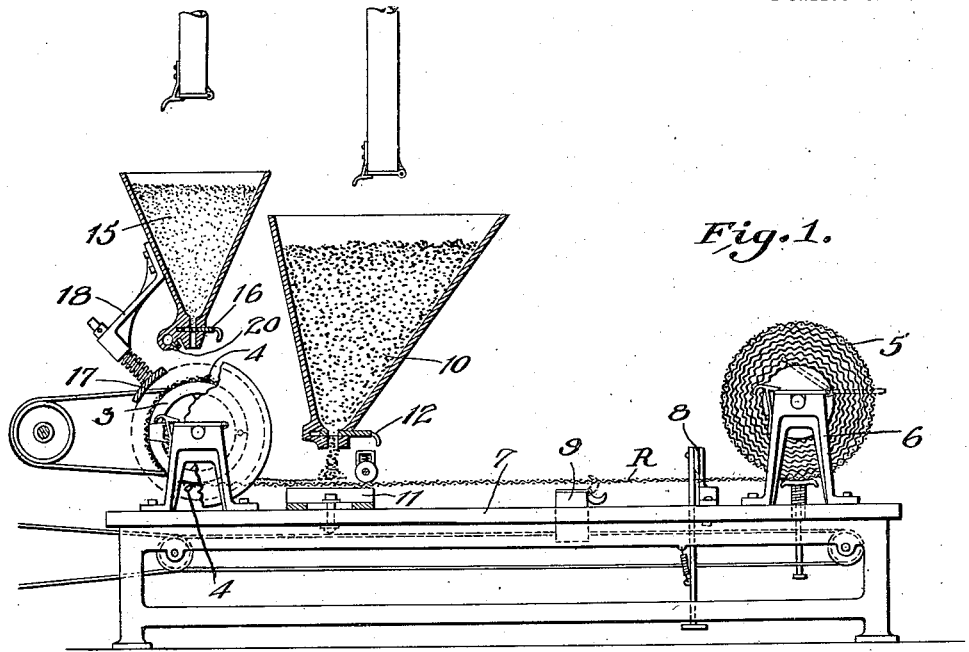

H. DONOGHUE.
APPARATUS AND METHOD FOR MAKING CONCRETE ELEMENTS.
APPLICATION FILED OCT. 29, 1917.

1,353,225.

Patented Sept. 21, 1920.
2 SHEETS—SHEET 1.

Inventor
Hugh Donoghue

H. DONOGHUE.
APPARATUS AND METHOD FOR MAKING CONCRETE ELEMENTS.
APPLICATION FILED OCT. 29, 1917.

1,353,225. Patented Sept. 21, 1920.

Inventor
Hugh Donoghue

By Mason Fenwick Lawrence,
Attorneys

UNITED STATES PATENT OFFICE.

HUGH DONOGHUE, OF MUNHALL, PENNSYLVANIA.

APPARATUS AND METHOD FOR MAKING CONCRETE ELEMENTS.

1,353,225. Specification of Letters Patent. Patented Sept. 21, 1920.

Application filed October 29, 1917. Serial No. 199,126.

*To all whom it may concern:*

Be it known that I, HUGH DONOGHUE, a citizen of the United States, residing at Munhall, in the county of Allegheny and State of Pennsylvania, have invented certain new and useful Improvements in Apparatus and Methods for Making Concrete Elements; and I do hereby declare the following to be a full, clear, and exact description of the invention, such as will enable others skilled in the art to which it appertains to make and use the same.

This invention relates to the art of manufacturing monolithic, reinforced elements from a self-hardening plastic material.

It is one of the objects of the present invention to provide a method for the economical, expeditious and practical manufacture of monolithic, reinforced elements from a self-hardening plastic material, such, for instance, as the manufacture of architectual elements as of concrete, which are reinforced and made of a plastic self-hardening cement.

Another object of the present invention is to provide a method whereby a rough coat of plastic material may be applied to a sheet of reinforce, and the whole wound around a drum or core, in such manner that the reinforce occupies a position outside the plastic material.

It is further an important object of the present invention to provide for the manufacture of plastic monolithic reinforced elements without the requirement of the usual expensive temporary or false form work now employed in this art.

It is a further object of the invention to provide means for applying the plastic coat to one side of the reinforce.

Another object of the invention is to provide a method whereby a rough form of the element is readily and quickly made, and may then be subsequently finished by applying to the exterior surface of the rough element, a layer of finishing material or coating and then dressing or producing a finishing surface on the structural element before the finish has set, so that a practically complete architectural element may be formed by the operation of the process in a series of relatively successive and immediately following steps.

With these and other objects in view, as will be rendered manifest in the following specification, the method consists in the application to one side of a sheet of reinforcing material, a layer of rough or coarse material forming the body of the structure and then winding the coated reinforce upon a drum or collapsible mold, the reinforce relatively overlapping the layer of plastic cement and continuing this until the desired number of layers of reinforce and cement have accumulated on the mold or drum, and further consists in applying to the rough mass, after it has been formed to the desired thickness, an exterior coating of finishing material, and then applying to the finishing coat, a tool or device whereby this coat is smoothed or finished off to the requisite degree as may be desired.

A further object of the invention is to provide a method whereby architectural elements of various transverse sections may be rapidly and economically produced, these sections being provided with an inserted reinforce arranged in suitable layers, each of which is provided with a coat of the plastic material, the method consisting in, first, creating a rough blank of reinforce plastic material and then in successively changing the transverse configuration of the blank through successive steps until the desired final form of the element is obtained, as will be more particularly described hereinafter.

Figure 2:
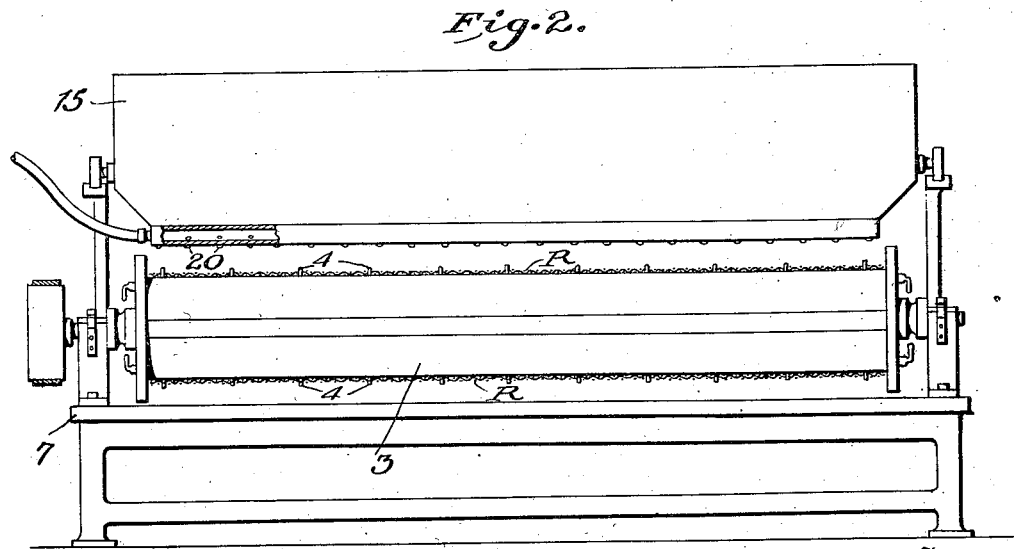
Figure 3:
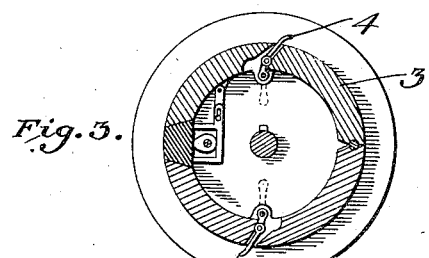
Figure 4:
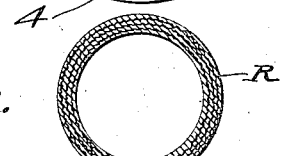
Figure 5:
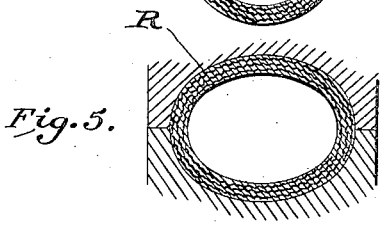
Figure 6:
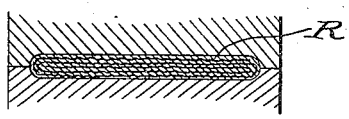
Figure 7:
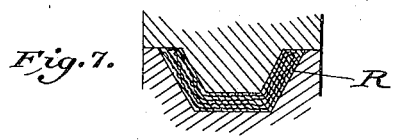
Figure 8:
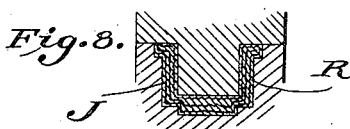
Figure 10:
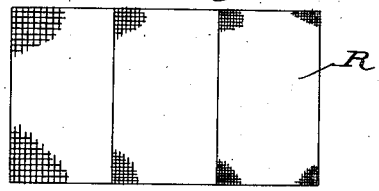
Figure 9:
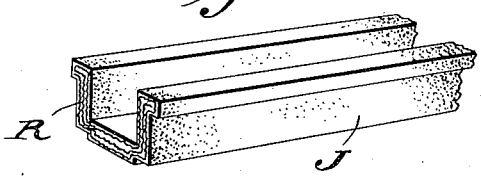

Another object of the present invention is to provide one form of apparatus whereby my method may be practised, a form of which is illustrated in the accompanying drawing, wherein, Figure 1 is a side elevation, partly in section of an apparatus of simple form, Fig. 2 is a front end view of the apparatus partly in section, Fig. 3 is a transverse section through the collapsible mold or drum, upon which the tube may be wound and the element formed, Fig. 4 is a transverse section through a tubular concrete reinforced element of cylindrical form, Figs. 5, 6, 7 show successive intermediate steps in the manufacture of an architectural element, Fig. 8 is a transverse section through the element in the finishing step, Fig. 9 is a perspective view of an architectural element in the form of a reinforced concrete door jamb or casing, Fig. 10 is a plan view showing a sheet of reinforce of different mesh in its different portions.

My present invention contemplates the manufacture of structural elements, for instance, of concrete although it is not to be so limited as the practice may be utilized in various arts where it is desired to produce a monolithic and reinforced element for various purposes and of various material. For purposes of illustration, such architectural elements as tubular columns as shown in section in Fig. 4, or flat bars as shown in Fig. 6, or gutter or angularly shaped troughs as shown in Fig. 7, or casing or jamb as shown in Figs. 8 and 9 may be produced, and this is accomplished by applying to a web, or sheet, or strip of reinforce R, a coat of plastic material, as cement, the coated reinforcing strip then being folded in successive layers to the desired thickness and proportion, this being accomplished, preferably as shown in the present instance, by the winding of the reinforce with its layer of cement on to a collapsible or other suitable drum illustrated in detail in Fig. 3, as provided with means 4 to which the fabric or reinforce may be attached, the drum being rotated by any suitable mechanism, so that the reinforcing layer R is wound thereon. The reinforce R may be supplied from any suitable source as from the drum 5 mounted on a slidable carriage 6 on a table 7 which is provided with a cutting device 8 so that the reinforce may be severed at the desired point as determined by the number of layers to be wound upon the mold drum 3. To facilitate fastening the leading end of the reinforce to the drum, any suitable means as a slide or carriage 9 may be utilized, this being shiftable along the table or frame 7 toward the molding drum, and the leading end of the reinforce can be readily connected to the fastening devices on the drum. The rough material for forming the interior of the body of the element which is being made, can be supplied from a reservoir or feed hopper 10 disposed above a platen 11 over which the reinforce is advanced to the drum, the supply being regulated by a gate 12. The rotary drum or mold 3 is detachably mounted upon suitable bearings, so that the concrete form when created thereon, may be lifted entirely clear of the frame of the apparatus and deposited at some convenient position and permitted to harden, thereby allowing another drum to be set on the apparatus ready for the formation of another structural element. There is shown in Fig. 10 a sheet of reinforce R provided with different degrees of mesh along its length, the coarser mesh of the wire or fabric being utilized to form the first layer of a column or tube being formed, and the finest mesh of the fabric at the opposite end of the strip occupying a position outermost in the tube after the entire sheet is wound on the drum, thus enabling the use of a coarse plastic body or cement from the hopper 10 for the interior construction of the tube or column, while a finer grade of material may be utilized for the finishing coat at the outer surface of the column or tube. After the rough coat has been applied to the requisite degree upon the form, being wound on the mold, then a coating of finishing material may be supplied from a hopper 15 provided with a gate 16 and disposed above the mold drum 3, so that when the latter is rotated, the finishing coat is applied to the surface thereof, this coat being dressed or smoothed off by any suitable device as a trowel or finisher 17, which is adjustably mounted upon a bracket 18, suitably supported upon the apparatus. Obviously, the finishing tool 17 may be of such a form as to give a smooth surface to the exterior of the tube or column being formed, or may be of such a design as to produce any other desired configuration to the surface.

While the finishing coat may be applied to the column being formed at the mold drum 3 by being flowed on to it, it is preferable that a blast of air be utilized adjacent the outlet of the hopper 15 so that the plastic material coming from the hopper can be forced onto the surface of the tube being formed, with considerable pressure, this being accomplished by the provision of a blast nozzle 20 arranged in juxtaposition to the outlet of the hopper 15.

From this it will be seen that I apply the layer of rough coat or cement from that surface of the reinforce R which will be innermost with relation to the finished body, and that I apply to the exterior surface of the tube formed of the rough material or coarse body, an exterior coating of finishing material of any suitable characteristic.

While the tube formed upon the rotary core 3 may be allowed to harden and then removed from the core, if it is desired to produce another form of architectural element than a tube, this is done by removing the cast tube from its core 3 and subjecting it to a succession of steps, by each of which the body is subjected to a shaping process according to the nature of the article desired. For instance, if I desire to produce an elliptical cross section element, the plastic tube is run through a set of rolls, or subjected to the pressure of other forms of molding means, as indicated in Fig. 5 to produce the desired contour, or if it is desired to produce a flat element in the form of a panel or board, this is done by again subjecting the member, for instance, after it has passed from the stage shown in Fig. 5 to molding means as represented in Fig. 6. This flat form of element may be again subjected to molding devices as shown in Fig. 7 wherein may be formed a trough-shaped device which may be utilized for a gutter or otherwise.

It is one of the important objects of the present invention to provide for the manufacture of a reinforced monolithic cement casing or jamb element, and to that end, the product shown in Fig. 7 may be again subjected to a molding process between suitable forms or shaping means designed to affect the shaping of the article as shown in Fig. 8, representing a door jamb J.

To facilitate the removal of the formed tube on the rotary drum or mold, the ends of the same shown in Fig. 2, are detachable, and these ends also serve for the purpose of molds for shaping the adjacent ends of the tube being formed on the rotary mold and may be given any deired configuration to produce cap and foot ends if desired.

What is claimed is:

1. In a device of the type described a table, a rotatable reel carrying reinforcing material, a collapsible drum rotatably mounted on said table, means for securing the reinforcing material to said drum, means for rotating said drum, means for applying a layer of cement to said fabric intermediate said drum and reel, and means for severing said reinforcing fabric intermediate said drum and reel and means for applying a finishing coat of cement and sizing the element after the reinforce is wound upon said drum.

2. The method of making a unitary, reinforced element of plastic material, which consists of employing a sheet of reinforcing material having coarse mesh at one end and fine mesh at the other, winding the sheet of reinforce upon a core beginning at the coarse end, continuously applying to the face of the sheet to be adjacent the axis, a layer of coarse plastic material while the sheet is being wound, and feeding an outer coating of fine material to the rough body of the formed element and applying a surfacing device and rotating the body.

In testimony whereof I affix my signature.

HUGH DONOGHUE.